No. 810,437. PATENTED JAN. 23, 1906.
G. D. SPRINGER & F. LISTER.
CAR WHEEL.
APPLICATION FILED JUNE 16, 1905.

Witnesses:

Inventors:
George D. Springer
and Frank Lister,
By
Attorney

UNITED STATES PATENT OFFICE.

GEORGE D. SPRINGER AND FRANK LISTER, OF SOUTH KNOXVILLE, TENNESSEE.

CAR-WHEEL.

No. 810,437.　　　　Specification of Letters Patent.　　　　Patented Jan. 23, 1906.

Application filed June 16, 1905. Serial No. 265,523.

*To all whom it may concern:*

Be it known that we, GEORGE D. SPRINGER and FRANK LISTER, citizens of the United States, residing at South Knoxville, State of Tennessee, have invented certain new and useful Improvements in Car-Wheels, of which the following is a specification.

The invention to be hereinafter described relates to car-wheels or analogous rotating bodies which turn upon their axles or journals; and the object of the present invention is to provide means whereby the friction and consequent wear of the rotating contacting surfaces is reduced to a minimum and the parts are readily assembled or taken apart for renewal or repairs.

In car-wheel structures and mounting where the wheel turns upon a fixed axle it has been proposed to chill or harden the interior surface of the wheel-hub; but in such construction the chilled or hardened surface of the hub turning upon the relatively softer metal of the axle causes much wear and rapid destruction of the axle, so that renewal thereof is frequently necessary. In devising means to overcome these and other objections we have found that good results could be secured by providing the contacting relatively rotating parts with chilled or hardened surfaces; but while the interior of the cast-metal wheel-hub could be thus treated and hardened it has been found practically difficult or impossible to secure a like chilled or hardened surface on the forged axle itself, any attempt in this direction being liable to detract from the desirable tough character necessary in the axle and the introduction of objectionable defects. We have therefore devised means whereby the inherent tough character of the axle itself may be retained, and yet there be provided between the wheel-hub and the part on which it rotates chilled or hardened surfaces. These results we secure by providing the interior of the wheel-hub with a chilled surface and mounting upon the axle a sleeve or bushing the exterior surface of which is chilled, said sleeve being detachably, but non-rotatively, mounted upon the axle and affording a chilled or hardened bearing for the chilled rotating surface of the wheel-hub itself.

Figure 2:
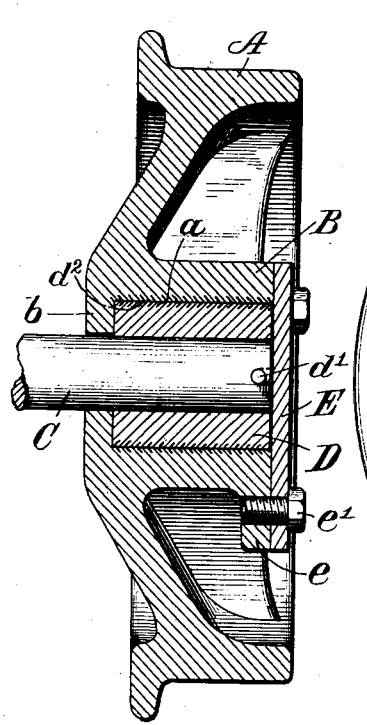
Figure 1:
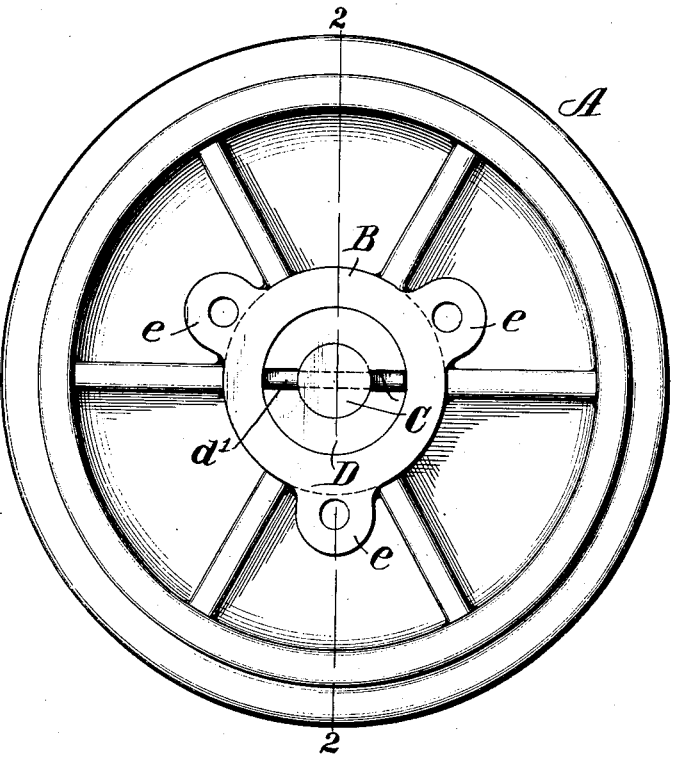
Figure 3:
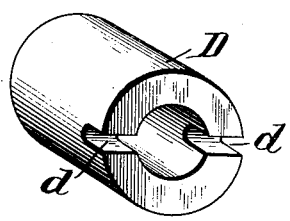

In the drawings, Figure 1 is a front elevation of a car-wheel or like rotatable element having the invention applied thereto. Fig. 2 is a section of the same on line $x\,x$, Fig. 1; and Fig. 3 is a perspective view of the sleeve or bushing detached.

The wheel A may be provided with the usual form of tread-surface and has formed or cast therewith the hub B, shown as an extended bearing. One end of the hub B is preferably provided with the inturned portion $b$, affording an opening for the passage of the axle C. It will be noted that the bore of the hub between the inturned portion $b$ and opposite end is considerably enlarged to afford a seat for the bushing or sleeve D, which accurately fits the same, said bushing or sleeve D being provided with a recess or slot $d$ to receive a pin $d'$, which passes through an opening in the end of the axle C, whereby the bushing or sleeve D is detachably, but non-rotatably, mounted upon the axle.

In order to hold the wheel A in proper operative position on the bushing or sleeve D, a cap E may be provided and secured to lugs $e$ of the wheel A by suitable means, such as the screw-bolt $e'$. The interior of the hub B of the wheel A is provided with a chilled or hardened surface $a$, extending throughout its contacting extent with the bushing D, and the exterior of the bushing D is likewise provided with a chilled surface $d^2$, such chilled surfaces being preferably formed during the casting operation.

From the construction thus described it will be seen that the bushing or sleeve D is non-rotatably and detachably secured to the end of the axle C, and its chilled exterior surface, stationary with respect to the axle C, affords contacting bearing for the interior chilled surface $a$ of the hub B, the result being that the two chilled or hardened surfaces of the bushing or sleeve and the hub of the wheel are relatively rotatable and in contact with each other. The interior surface of the hub B, as well as the exterior surface of the bushing or sleeve D, is preferably cylindrical, so that by removing the cap E from the wheel and moving the wheel slightly to the right in Fig. 2 after the cap is removed the pin $d'$ can be detached and the bushing or sleeve D be readily taken from its seat within the wheel-hub and upon the axle and renewed or repaired when desired.

While we have shown a particular form of wheel structure and of means for securing the bushing or sleeve in place upon the axle, it is evident, of course, that variations in these details of structure may be made within the scope of the present invention, which contemplates, as hereinbefore set forth, the chilled interior surface of the hub rotating upon the chilled exterior surface of the bushing, the latter itself being seated within the wheel-hub and held non-rotatably, but detachably, to the axle.

Having thus described our invention, what we claim, and desire to secure by Letters Patent, is—

1. In a device of the class described, a wheel having a hub, said hub having its interior bearing-surface chilled or hardened, and a bushing or sleeve having its exterior surface chilled or hardened and contacting with the chilled or hardened interior surface of the hub, the hub and bushing or sleeve being relatively rotatable.

2. In a device of the class described, a wheel having a hub provided with a cylindrical opening therethrough, the interior bearing-surface of said opening being chilled or hardened, and a cylindrical bushing fitted within the said wheel and having its exterior bearing-surface chilled or hardened, said hub and bushing being relatively rotatable.

3. In a device of the class described, a wheel having a hub provided with a cylindrical opening therethrough, the interior surface of said hub being chilled or hardened, a bushing fitted within the hub and having its exterior surface chilled or hardened, an axle and means for securing the bushing to the axle to provide chilled or hardened rotating bearing-surfaces between the wheel-hub and bushing.

4. The combination of a wheel having a hub provided with a cylindrical opening therethrough, the interior surface of said hub being chilled or hardened, a cylindrical bushing, having its exterior surface chilled or hardened, and seated within said hub, an axle and a pin for securing the bushing non-rotatably to the axle to afford chilled rotating bearing-surfaces between the interior surface of the hub and exterior surface of the bushing.

5. The combination of a wheel having a hub provided with an opening therethrough, the interior surface of said hub being chilled or hardened, an inturned portion at one end of the hub, a bushing having its exterior surface chilled or hardened and seated within the opening in the hub, an axle, means for securing the bushing to the axle, and a cap secured to the wheel and extending over the end of the bushing and axle.

In testimony whereof we affix our signatures in presence of two witnesses.

GEORGE D. SPRINGER.
FRANK LISTER.

Witnesses:
NORMAN B. MORRELL,
CHARLES SEYMOUR.